United States Patent [19]

Singleton, Jr.

[11] 3,963,454

[45] June 15, 1976

[54] BRAZING MATERIALS
[75] Inventor: Ogle R. Singleton, Jr., Richmond, Va.
[73] Assignee: Reynolds Metals Company, Richmond, Va.
[22] Filed: Dec. 10, 1974
[21] Appl. No.: 531,391

[52] U.S. Cl. ............................... 29/197.5; 75/147
[51] Int. Cl.² ........................................ B32B 15/20
[58] Field of Search ............ 75/147, 148, 141, 142, 75/146; 148/32, 32.5; 29/197.5, 197

[56] References Cited
UNITED STATES PATENTS
2,026,541   1/1936   Kempf et al. ........................ 75/147
2,026,542   1/1936   Kempf et al. ........................ 75/148

Primary Examiner—R. Dean
Attorney, Agent, or Firm—Glenn, Palmer, Lyne, Gibbs & Clark

[57] ABSTRACT

An aluminum-silicon brazing composition containing 0.05 to 0.3% lead by weight, with silicon in the range of 7 to 14% and magnesium in the range of 0.2 to 2%, preferably the composition being employed as a cladding layer on a magnesium-containing aluminum base core alloy.

6 Claims, No Drawings

BRAZING MATERIALS

BACKGROUND OF THE INVENTION

This invention pertains generally to the art of joining aluminum alloy components by brazing and, it pertains in particular to compositions used for vacuum brazing. For purposes of this application the term "vacuum" refers to environments where pressures are below $100 \times 10^{-3}$ torr and the partial pressures of water and oxidizing species, such as $O_2$, are below $1 \times 10^{-4}$ torr and $8 \times 10^{-4}$ torr, respectively.

As is well known, aluminum alloys containing silicon are appreciated as useful compositions for brazing. Furthermore, it has been recognized that the addition of small amounts of magnesium makes such alloys suitable for vacuum brazing. An unsolved problem has been to find a brazing composition capable of tolerating pressure variations commonly encountered in commercial vacuum brazing operations and effective at relatively mild residual air vacuums on the order of $10^{-4}$, or even $10^{-3}$ torr.

One partially successful solution to the problem has been attained by raising the magnesium content as high as 2.3%, the usual content being less than 1%. (Unless otherwise apparent from the context, percentages given in this application refer to percentages by weight.) The shortcomings of this approach have been found to be two-fold, however. For one thing, the increased level of magnesium tends to frustrate attempts to apply the composition in the form of a cladding and, consequently, results in a higher generation of scrap material. Secondly, magnesium tends to distill or sublime from the composition during brazing, forming deleterious deposits in the brazing chamber.

In accordance with the present invention, it has been found that a brazing composition consisting essentially of aluminum, silicon, magnesium and lead has especially desirable properties for purposes of vacuum brazing. About 0.1% lead is usually sufficient.

The use of lead in lieu of increasing the level of magnesium has been found not only to be substantially free of the drawbacks mentioned in association with the latter alternative; it is also less expensive. For the particular advantages and benefits of the invention, reference is made to the tests and related results and discussion, which are set forth later below.

SUMMARY OF THE INVENTION

This application relates to an improved aluminum-silicon brazing composition for joining aluminum alloy components by vacuum brazing. The composition consists of 7 to 14% silicon, 0.2 to 2% magnesium, 0.05 to 0.3% lead, less than 0.6% iron, 0.3% manganese and 0.15% incidental impurities (less than 0.05% each of Cu, Mn, Ni, Zn, Ti and others), and a balance of aluminum.

The composition may be used alone in the form of a shim, wire or rod or it may be applied as a cladding on the aluminum alloy components that are desired to be brazed. The cladding may be on one or both sides of the core component, or it may even be sandwiched between core layers, and it typically constitutes from about 5 to 20% of the composite thickness. All these and equivalent embodiments shall for convenience be hereinafter collectively referred to as brazing elements.

DESCRIPTION OF THE PREFERRED EMBODIMENTS

The invention as preferably practiced consists of 9 to 11% silicon, 0.7% to 1.2% magnesium, 0.07 to 0.12% lead, less than 0.15% incidental impurities and a balance of aluminum.

In particularly effective embodiments the above composition is employed as the outer cladding layer on an aluminum alloy core component, preferably an alloy of the type containing 0.1 to 0.3% magnesium, less than 0.25% copper, 0.3% silicon, 0.4% manganese and 0.15% incidental impurities, and a balance of aluminum, or the type containing 0.4 to 0.8% silicon, 0.25 to 0.4% manganese, 0.4 to 0.8% magnesium, less than 0.8% iron, 0.35% chromium, 0.35% copper, 0.35% zinc and 0.15% incidental impurities, and a balance of aluminum. Suitable core alloys further include 1100, 3003, 3004, 3005, 3105, 6063 and 6951.

When using the invention, I prefer to conduct the brazing operations in a low-leak environment at a reduced pressure of about $2 \times 10^{-4}$ torr or lower, especially when the brazing alloy has a relatively low magnesium content such as 0.2 to 0.4%. At higher magnesium levels, 0.8 to 1.5%, for example, a pressure of $3 \times 10^{-3}$ torr ordinarily suffice provided that the chamber loading is on the order of 0.1 square feet of brazing alloy per cubic foot of chamber; this has found to be true regardless of whether a residual air atmosphere or an inert gas atmosphere of equivalent $H_2O$ and $O_2$ partial pressures is used. To compensate for lesser volumes of brazing alloy, scrap sheets of brazing composite may be added or other means such as conventional sublimation pumping may be employed.

EVALUATION PROCEDURE

As noted earlier, a number of tests were made for the purpose of revealing the qualities of the invention and comparing them to those of other known compositions. These tests were run according to the standard procedure set out below, which is offered, by way of example, to illustrate the practice of the invention.

I. The Gap-Joint Specimen

A typical gap-joint specimen, assembled and ready for brazing, was prepared from four strips of cladded alloy sheet, each strip measuring $0.20 \times 0.50 \times 3.0$ inches. All of the strips were provided with a pair of ⅛ inch D holes spaced 2½ inches apart, one of the holes being located three-eighths inch from an end. Two of the strips were provided with a centrally positioned $1/32 \times 1/16 \times 2$ inch ridge to resist any tendency of a strip to sag when heated.

The two strips with ridges were respectively paired with the other two strips, the holes being matched and the ridges facing to the outside. The two strip pairs were then mounted to a stainless steel carrier by passing four mounted screws through the holes in the strips and securing them to the carrier. The effect of the mounting was to locate the two strip pairs in parallel and even relation substantially within the same horizontal plane, with the strip ridges facing upward. So as to provide support for the strip pairs and to insulate them from the carrier, a corrugated section of 3003 fin stock was placed between the carrier and the strips prior to mounting. The strips were accordingly spaced about one/half inch above the carrier.

Before the mounting screws were tightened, a length of 24 gauge (0.0201 inch D) aluminum wire was placed centrally between the paired strips, the wire placement being substantially perpendicular to the length of the strips. As a consequence of this step, between paired strips there occurred gaps which extended about five-/eighths inch from each side of the wire. By counting as separate the gaps on opposite sides of the wire, there were a total of four gaps, there being two gaps per strip pair and two pairs of strips. The gaps thus formed were similar to, but larger than, gaps commonly encountered in production assemblies.

A final element of the assembly was a ⅛ inch D stainless steel sheathed thermocouple of type K. The thermocouple was mounted on the carrier in a position between, but not in contact with, the strip pairs. Thus the thermocouple was utilized to provide a comparative, as distinguished from an absolute, indication of specimen temperature.

The thermocouple sheathing served a dual purpose in that it was useful as a pushrod for moving the carrier to different furnace temperature zones during brazing operations. The sheathing extended through the O-ring seal in a removable furnace door.

II. Procedure

The cladded alloy brazing sheet was oiled if handled by hand. Prior to assembly of the specimen, all parts were solvent degreased in perchloroethylene. After degreasing gloves were used to avoid fingermarks on the material.

Assembled gap-joint specimens were individually subjected to a brazing cycle consisting of the following steps:
1. Vent furnace to air, the furnace hot zone being at temperature.
2. Remove blank-off furnace door.
3. Slide specimen into warm (300° to 500° F) zone of furnace and secure door.
4. Pump furnace to desired vacuum and hold using throttling valve.
5. Using thermocouple sheathing as a push rod, insert specimen into the hot zone.
6. Record thermocouple output and system pressure during brazing cycle.
7. After 10 minutes, withdraw specimen to the warm zone.
8. When thermocouple indicates less than 800° F, vent furnace and remove specimen and furnace door.
9. Replace door and pump down furnace.

Brazed specimens were then cooled, removed from the carriers and examined visually. Evaluation was based on the number of, and the extent to which, the gaps sealed by brazing flow. The goal was to seal all four gaps with respect to a given specimen.

Brazing environment was measured as a function of temperature and pressure. Because temperatures were nearly the same from test to test, however, pressure was the only substantial variable. Pressure was determined with either an NRC 527 ion gauge and a 710 controller or a Hastings DV6 gauge and meter. Pressure control was effected by a vacuum pump gate valve.

EVALUATION RESULTS AND DISCUSSION

For test purposes, the invention was embodied in the form of a brazing composition consisting of 10% silicon, 0.3% iron, 1% magnesium, 0.1% lead, less than 0.15% incidental impurities, and a balance of aluminum. The composition was applied as a cladding to both sides of 0.020 inch aluminum alloy sheet, the cladding constituting 15% of the composite thickness. In one case 3005 was used as the core alloy and 1100 was used in another. The composite sheet was annealed in both cases.

Where the 3005 core alloy was used, four gaps were sealed at a pressure of 1.1 to $1.8 \times 10^{-3}$ torr, the final brazing temperature being 1109° F. In the case of the 1100 core alloy, four gaps were sealed at a pressure of 0.9 to $1.2 \times 10^{-3}$ torr and a final temperature of 1114° F.

By way of comparison with the above, tests were conducted with respect to a brazing alloy consisting of 10.7% silicon, 0.27% iron, 1.07% magnesium, less than 0.15% incidental impurities, and a balance of aluminum. The alloy was applied as a cladding to both sides of 0.020 inch aluminum alloy sheet, the cladding constituting 15% of the composite thickness. The core alloy consisted of 0.25 to 0.50% silicon, 0.30 to 0.70% iron, 0.30 to 0.50% manganese, 0.20 to 0.40% magnesium, less than 0.10% copper, 0.15% cromium and 0.15% incidental impurities, and a balance of aluminum. Again the composite sheet was annealed. In one test no gaps were sealed to a pressure of 5 to $6 \times 10^{-4}$ torr and a final temperature of 1115°F; and, in another test, no gaps were sealed at a pressure of 1.3 to $2.5 \times 10^{-4}$ torr and a final temperature of 1119°F.

Finally, a test was conducted using a composite sheet as described above with the following differences. The brazing alloy consisted of 11.4% silicon, 0.69% magnesium, 0.38% iron, 0.13% manganese, less than 0.15% incidental impurities, and a balance of aluminum. Also, the composite sheet was tested "as rolled" and not as annealed. Four gaps were sealed at a pressure of 5 to $7 \times 10^{-4}$ torr and a final temperature of 1120°F.

Four points should be made in connection with these tests and results. First, the addition of small amounts of lead to Al - Si - Mg alloys has a definite tendency to enhance their brazing properites. Second, while the results displayed some dependency on the core alloy used, the effect does not seem to be substantial. It is noted, however, that the compositions of the core alloys tested were reasonably similar and, therefore, it may be premature to overlook their significance. A third point relates to the apparent detrimental effect of annealing. Inspite of the fact that annealing requires an expense and that it negatively affects brazing, it is nevertheless necessary and desirable in cases where the composite sheet must be further formed. The presence of lead seems helpful in this regard, since the annealed lead-containing alloy worked at least as well under a less severe vacuum than the unannealed lead-free comparison alloy. Lastly, a further comparison of these results can be made with those obtained using Al - Si - Mg alloys to which bismuth has been added, reference being made to copending application, Ser. No. 363,910 filed May 25, 1973, now Pat. No. 3,853,547. While the addition of bismuth apparently gives rise to superior pressure tolerances, the advantage may be outweighed by the significantly lower cost of lead.

What is claimed is:
1. An article which comprises an aluminum alloy core and an outer cladding layer, the outer cladding layer being bonded to one side of the aluminum alloy core and being made of an alloy consisting essentially of 7 to 14% silicon, 0.2 to 2% magnesium, 0.05 to 3% lead, less than 0.6% iron, 0.3% manganese and 0.15% incidental impurities, and a balance of aluminum.
2. The article of claim 1 wherein the aluminum alloy core consists of 0.1 to 0.3% magnesium, less than

0.25% copper, 0.3% silicon, 0.4% manganese and 0.15% incidental impurities, and a balance of aluminum.

3. The article of claim 1 wherein the aluminum alloy core consists of 0.4 to 0.8% silicon, 0.25 to .4% manganese, 0.4 to 0.8% magnesium, less than 0.8% iron, 0.35% chromium, 0.35% copper, 0.35% zinc and 0.15% incidental impurities, and a balance of aluminum.

4. An article which comprises an aluminum alloy core and an outer cladding layer bonded to each side of the aluminum alloy core, each outer cladding layer being made of an alloy consisting essentially of 7 to 14% silicon, 0.2 to 2% magnesium, 0.05 to 3% lead, less than 0.6% iron, 0.3% manganese and 0.15% incidental impurities, and a balance of aluminum.

5. The article of claim 4 wherein the aluminum alloy core consists of 0.1 to 0.3% magnesium, less than 0.25% copper, 0.3% silicon, 0.4% manganese and 0.15% incidental impurities, and a balance of aluminum.

6. The article of claim 4 wherein the aluminum alloy core consists of 0.4 to 0.8% silicon, 0.25 to 0.4% manganese, 0.4 to 0.8% magnesium, less than 0.8% iron, 0.35% chromium, 0.35% copper, 0.35% zinc and 0.15% incidental impurities, and a balance of aluminum.

* * * * *